US011249973B2

(12) United States Patent
Keller

(10) Patent No.: US 11,249,973 B2
(45) Date of Patent: Feb. 15, 2022

(54) QUERYING PARTITIONED TABLES IN A DISTRIBUTED DATABASE

(71) Applicant: SAP SE, Walldorf (DE)

(72) Inventor: Friedrich Keller, Karlsruhe (DE)

(73) Assignee: SAP SE, Walldorf (DE)

( * ) Notice: Subject to any disclaimer, the term of this patent is extended or adjusted under 35 U.S.C. 154(b) by 348 days.

(21) Appl. No.: 15/970,756

(22) Filed: May 3, 2018

(65) Prior Publication Data

US 2019/0340274 A1    Nov. 7, 2019

(51) Int. Cl.
*G06F 16/22* (2019.01)
*G06F 16/24* (2019.01)
*G06F 16/27* (2019.01)

(52) U.S. Cl.
CPC ...... *G06F 16/2282* (2019.01); *G06F 16/2255* (2019.01); *G06F 16/24* (2019.01); *G06F 16/278* (2019.01)

(58) Field of Classification Search
None
See application file for complete search history.

(56) References Cited

U.S. PATENT DOCUMENTS

| 8,819,027 | B1 * | 8/2014 | Sivasubramanian | ........................ G06F 16/278 707/747 |
| 2009/0157684 | A1 * | 6/2009 | Andersen | ............ H04L 67/1029 |
| 2011/0302583 | A1 * | 12/2011 | Abadi | ................. G06F 16/2471 718/102 |
| 2014/0032528 | A1 * | 1/2014 | Mandre | ............. G06F 16/24542 707/718 |
| 2014/0351291 | A1 * | 11/2014 | Fricke | ................... G06F 16/211 707/803 |
| 2016/0092544 | A1 * | 3/2016 | Shivarudraiah | ..... G06F 16/2455 707/600 |

* cited by examiner

*Primary Examiner* — Aleksandr Kerzhner
*Assistant Examiner* — Eddy Cheung
(74) *Attorney, Agent, or Firm* — Mintz Levin Cohn Ferris Glovsky and Popeo, P.C.

(57) ABSTRACT

A method and a system for querying partitioned tables in a distributed database is disclosed. In one aspect, a method includes receiving a request to access multiple data elements, identified by record identifiers from a partitioned and distributed database table. The method further includes mapping record identifiers to partitions. The method further includes sorting the record identifiers by database node and partition. The method further includes generating, for each database node and partition, at least one statement including at least one request to access a data element stored in the corresponding partition. The method further includes responding to the request by routing the at least one statement generated for each database node and partition.

20 Claims, 5 Drawing Sheets

QUERYING PARTITIONED TABLES IN A DISTRIBUTED DATABASE

FIELD

The present disclosure generally relates to database processing and, more specifically, to querying partitioned tables in a distributed database system.

BACKGROUND

Data in a distributed database system is stored across a multitude of physically and/or logically distinct database nodes. For example, data in a distributed database system may be partitioned and stored on different computers. Alternately or additionally, data in a distributed database system may be managed by separate processes running multiple and/or concurrent threads. As such, executing a query (e.g., a structured query language (SQL) statement or the like) in a distributed database system may require multiple partitions in multiple database nodes to perform operations on the data stored at and/or managed by each individual database node. The volume of concurrently active threads may be limited by server hardware, for example, the number of sockets and cores in each server. Performance can be affected as the number of concurrent queries increases and databases scale-out.

SUMMARY

Methods, systems, and articles of manufacture, including computer program products, are provided for querying partitioned tables in a distributed database. In one aspect, there is a method that includes receiving, from a client, a request to access multiple data elements. The data elements are identified by document identifiers. Each data element is stored in one of multiple partitions of a database table. Each partition is stored on one of multiple database nodes. The method further includes mapping each document identifier to the partition in which the corresponding data element is stored. The method further includes sorting the plurality of document identifiers by the database node and partition in which each corresponding data element is stored. The method further includes, for each database node and partition, generating at least one statement addressed to the corresponding database node and partition. Each of the at least one statements includes at least one request to access a data element stored in the corresponding partition. The method further includes, in response to the request, routing the at least one statement generated for each database node and partition.

In optional variations one or more additional features, including but not limited to the following, can be included in any feasible combination. For example, the method may further include determining, for each database node and partition, whether a length of a single statement including all of the record identifiers for the respective partition exceeds a maximum block size. A single statement may be generated in response to determining that the length of the single statement is less than or equal to the maximum block size. Multiple statements may be generated in response to determining that the length of the single statement exceeds the maximum block size. The multiple statements generated may be of substantially fixed length, less than or equal to the maximum block size. All but one of the statements generated may be of substantially equal length corresponding to a maximum block size. Record identifiers may be mapped to the partition in which the corresponding data element is stored using a hash table and/or minimum and maximum record identifier values.

Systems and methods consistent with this approach are described as well as articles that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
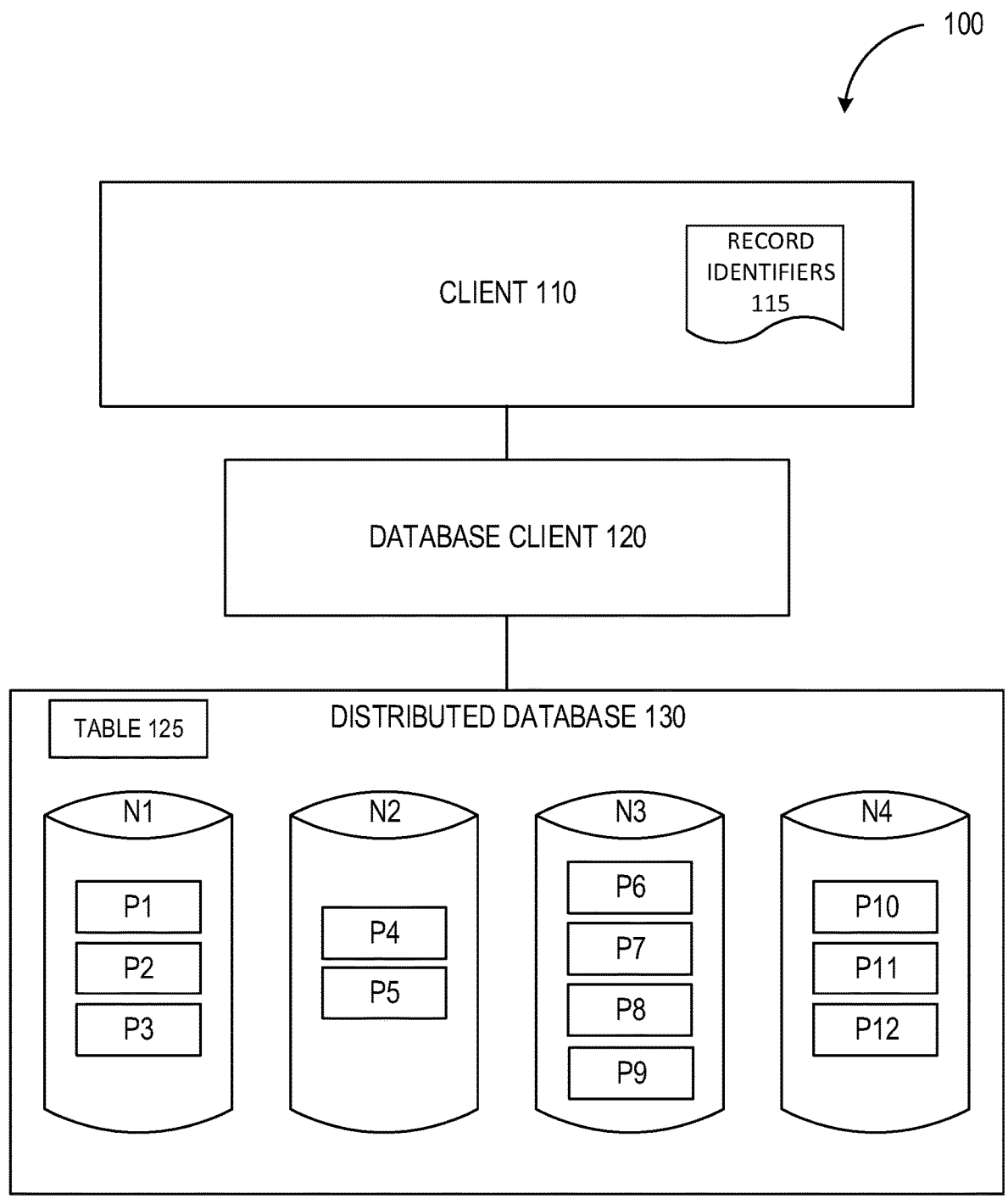
FIG. 1 depicts a distributed database consistent with implementations of the current subject matter.

As databases scale-out to terabyte, petabyte, exabyte, or larger scale, database tables may be partitioned and distributed onto multiple database nodes. Each database node N may store zero, one, or multiple partitions P of each database table 115, as illustrated in FIG. 1. Therefore, data from a single database table 125 may be stored in multiple partitions P on multiple database nodes N, for which a database client 120 maps queries from application software on client 110 to the partitions P. In the example of FIG. 1, a database table 125 is partitioned into partitions P1-P12. Partitions P1-P3, P4-P5, P6-P9, and P10-P12 are distributed onto database nodes N1, N2, N3, and N4, respectively. Such distributed databases 130 may use concurrent threads to improve the performance of queries to partitioned tables. The number of threads increases with increased traffic between database nodes, which may be required if data from partitions in more than one database node are required to fulfill a work package. The number of threads may also increase within a database node if multiple partitions on the database nodes are required to fulfill a work package.

The number of concurrently active threads is limited by database node server hardware on database nodes N, such as the number of sockets and cores available. High numbers of concurrent threads can lead to performance bottlenecks. Certain implementations of the disclosed technology may provide benefits relating to reducing the volume of threads, and/or increasing efficiency when fulfilling work packages for queries that require access to large numbers of data elements or record identifiers 115 in tables partitioned across multiple database nodes. Record identifiers 115 generally correspond to identifiers used to locate a document, record, or data element in one or more database tables.

Distributed databases may partition tables by hash partitioning, range partitioning, interval partitioning, list partitioning, or other partitioning methods known in the art. In hash partitioning, a hash key is used to distribute elements of the database, across different partitions. In range partitioning, each partition includes the set of database elements, such as rows, that fall within a range distinct from other partitions. Interval partitioning extends range partitioning by automatically creating partitions of a specified interval when data inserted into a table exceeds the existing range partitions. In list partitioning, a list of discrete values defines the partitioning. Each partition is stored on database nodes.

A database client 120, as well as database nodes N, are each able to map table elements to its partition P. This mapping may be accomplished using a hash table for hash partitioning, min and max element values for range or interval partitioning, or a listing map for list partitioning. While the database client 120 and database nodes N are each able to map table elements to its respective partitions, it is not necessary for the application software on client 110 that generates a query to be able to map the table elements to its partition P. Instead, the application software that generates queries may rely on a database client 120 or this mapping.

Queries include read and/or write operations for elements of database tables that may be partitioned and distributed across multiple database nodes. Once queries are generated by application software, a database client able to map table elements to partitions determines which database nodes N and which partition(s) N include data elements corresponding to the record identifiers 115. The record identifiers 115 identify elements in a database table 125 that are the subject of read/write operation.

The database client 120 receives queries and maps the requested query elements or record identifiers 115 to partitions P using, for example, a hash table for hash partitioning, min and max element values for range or interval partitioning, or a listing map for list partitioning. The database client maps partitions to their respective database nodes. Once the partitions are identified, the database client generates statements that are addressed or routed to individual database nodes. Each statement includes record identifiers 115 and their respective partitions.

If all of the record identifiers 115 map to a single partition on a single database node, the database client can generate one or more statements that are routed to the single database node, and include record identifiers 115 associated with the single partition. As all of the record identifiers 115 map to a single partition on a single database node, there is no need for the database client to generate statements that are routed to other database nodes, or that refer to other partitions, to fulfill the query. The "best" database node to route statements to is the single database node. There is no need for the receiving database node to generate statements to other database nodes to fulfill the query.

Figure 2:
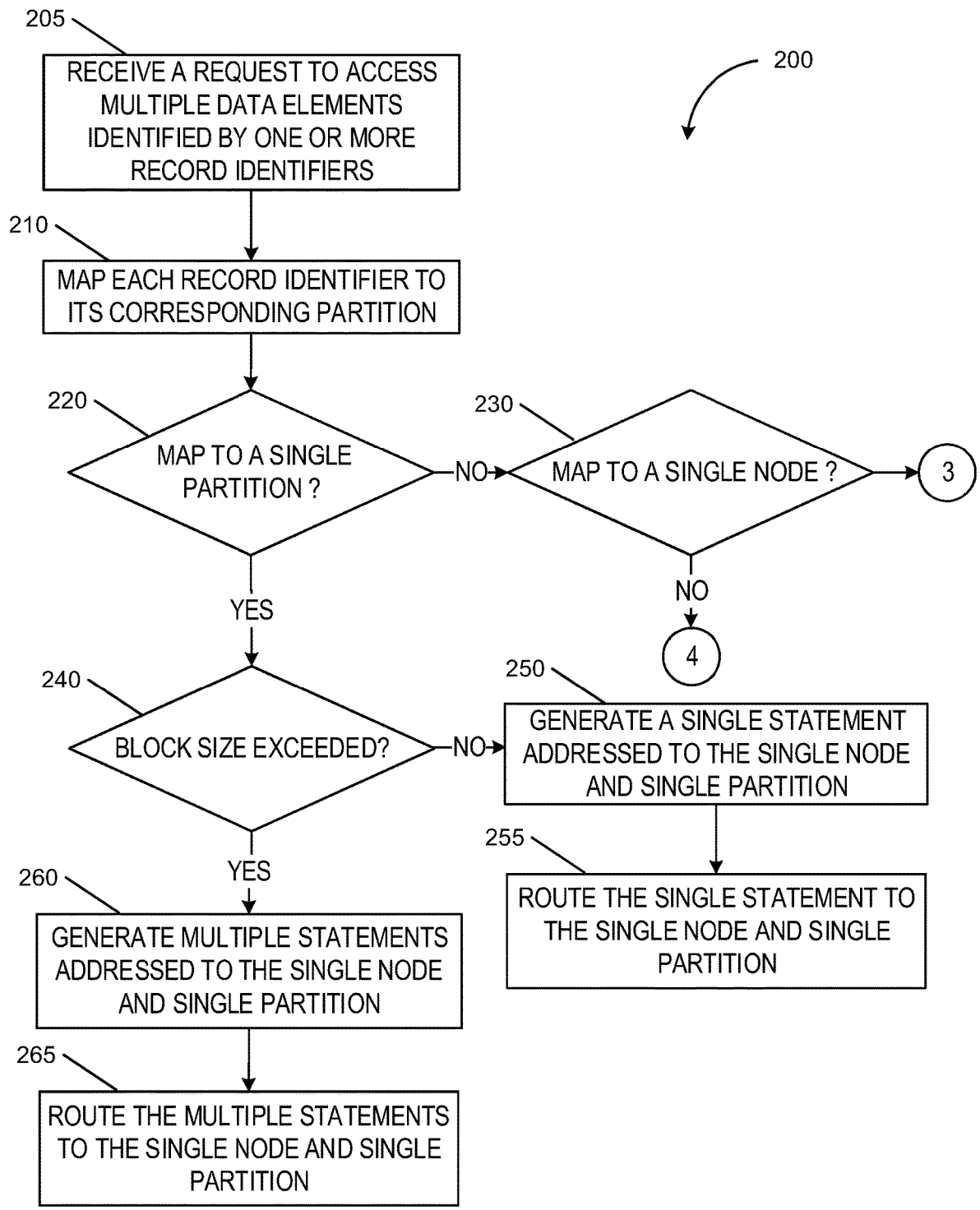
FIG. 2 depicts a process flowchart illustrating features of a method for querying partitioned tables in a database when all record identifiers are in a single partition on a single database node.

FIG. 2 depicts a process flowchart illustrating features of a method 200 for querying partitioned tables in a database when all record identifiers 115 are in a single partition on a single database node. For example, all the record identifiers 115 may be within partition P7 on database node N3 in FIG. 1.

In 205, database client 120 receives a request from client 110 to access multiple data elements identified by one or more record identifiers 115 in distributed database 130.

In 210, database client 120 maps each queried record identifier 115 to a partition P, and assigns a partition identifier and database node identifier to each record identifier 115.

In 220, database client 120 determines whether all of the record identifiers 115 map to a single partition on a single database node. If they do, method 200 continues.

If not, in 230, database client 120 determines whether the record identifiers 115 map to multiple partitions on a single database node. If they do, control shifts to marker 3 for method 300 in FIG. 3. If they don't, control shifts to marker 4 for method 400 in FIG. 4.

In 240, the database client 120 determines if the record identifiers 115 would result in a statement that exceeds a maximum block size.

If not, in 250, the database client 120 generates a single statement addressed to the single database node with the full set of record identifiers 115. In 255, the database client 120 routes the single statement to the single database node with the full set of record identifiers 115.

If the number of record identifiers 115 would result in a statement that exceeds a maximum block size, in 260 the database client 120 generates multiple statements, so that each statement has a length less than or equal to the maximum block size. For some embodiments, the database client segments the record identifiers 115 list into substantially equal length packages. The database client then generates a statement for each package of a substantially fixed length less than or equal to a maximum block size. For some embodiments, the database client segments the record identifiers 115 list so that all but the final package are of substantially equal length corresponding to a maximum block size, and the final shorter length package includes the remaining record identifiers 115. The database client then generates a statement for each package. All but the last generated statement has a length substantially equal to the maximum block size. The last generated statement with the remaining record identifiers 115 has a length less than or equal to a maximum block size.

In 265, the database client 120 routes the multiple statements to the single database node and the single partition.

Figure 3:
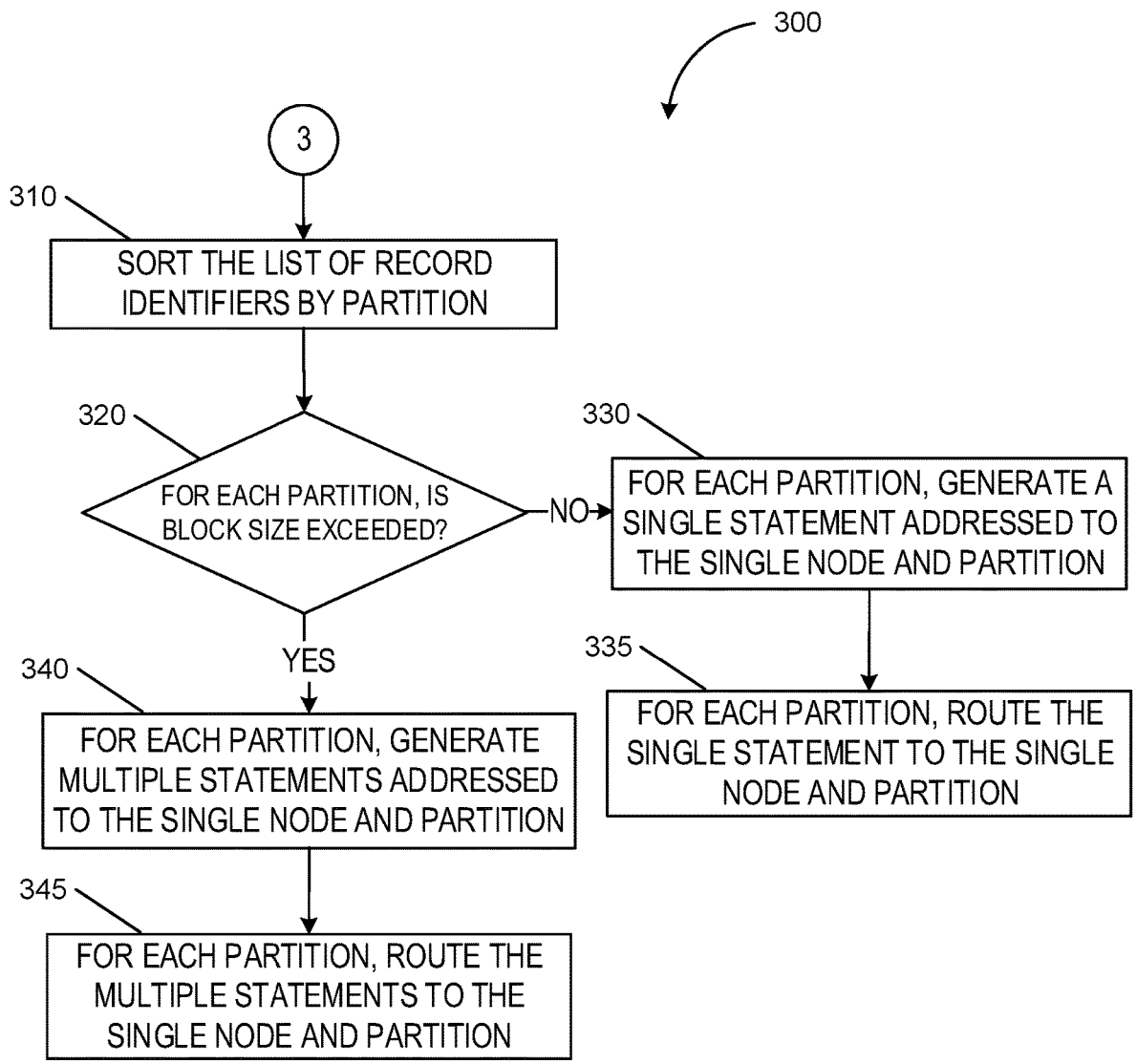
FIG. 3 depicts a process flowchart illustrating features of a method for querying partitioned tables in a database when the record identifiers are in multiple partitions on a single database node.

FIG. 3 depicts a process flowchart illustrating features of a method 300, which continues on from method 300, for querying partitioned tables in a database when the record identifiers 115 are in multiple partitions on a single database node. For example, all the record identifiers 115 may be within partitions P7, P8, and P9 on database node N3 in FIG. 1.

As all of the record identifiers 115 map to multiple partitions on a single database node, the database client can generate statements that are routed to the single database node, and there is no need for the database client to generate statements that are routed to other database nodes to fulfill the query. The "best" database node to route statements to is the single database node. However, the record identifiers 115 map to multiple partitions on the single database node.

In 205, database client 120 receives a request from client 110 to access multiple record identifiers 115 in distributed database 130. In 210, database client 120 maps each record identifier 115 to a partition P, and assigns a partition identifier and database node identifier to each queried record identifier. In 220, database client 120 determines whether all of the record identifiers 115 map to a single partition on a single database node. If not, in 230, database client 120 determines whether the record identifiers 115 map to multiple partitions on a single database node. If they do, control shifts to marker 3 for method 300 in FIG. 3.

In 310, the database client 120 sorts the record identifiers 115 by partition.

For each partition, in 320, the database client 120 determines if the record identifiers 115 for the respective partition would result in a statement that exceeds a maximum block size.

If not, for each partition, in 330, the database client 120 generates a single statement addressed to the single database node and the corresponding partition. In 335, for each partition, the database client routes the single statement to the single database node and the corresponding partition.

If the maximum block size is exceeded, for each partition, in 340 the database client 120 generates multiple statements addressed to the single database node and the corresponding partition. This enables the receiving database node to process each statement using a single respective partition for each statement. This may increase efficiency on the single database node, as each package can be processed using the corresponding partition for that package. If the number of record identifiers 115 that map to a corresponding partition on the single database node would result in a statement that exceeds a maximum block size, the database client generates multiple statements, so that each statement has a length less than or equal to the maximum block size. For some embodiments, the database client segments the record identifier 115 list for the corresponding partition into substantially equal length packages. The database client then generates a statement for each package of a substantially fixed length less than or equal to a maximum block size. For some embodiments, the database client segments the record identifier 115 list for the corresponding partition so that all but the final package are of substantially equal length corresponding to a maximum block size, and the final shorter length package includes the remaining record identifiers 115. The database client then generates a statement for each package. All but the last generated statement for the corresponding partition has a length substantially equal to the maximum block size. The last generated statement with the remaining record identifiers 115 has a length less than or equal to a maximum block size.

In 345, for each partition, the database client routes the multiple statements to the single database node and corresponding partition.

Figure 4:
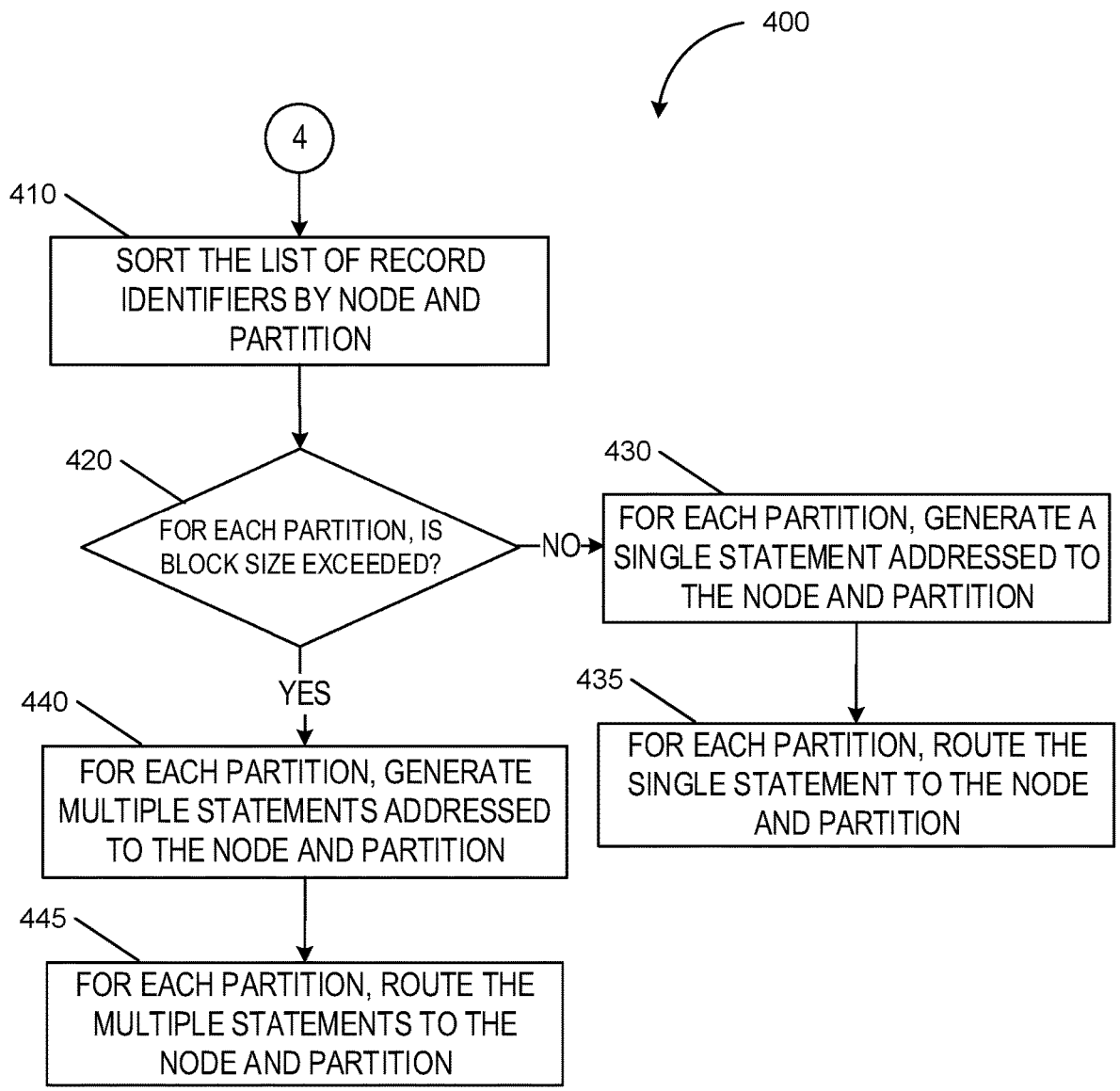
FIG. 4 depicts a process flowchart illustrating features of a method for querying partitioned tables in a database when the record identifiers are in multiple partitions on multiple database nodes.

FIG. 4 depicts a process flowchart illustrating features of a method 400, which follows on from method 300, for querying partitioned tables in a database when record identifiers 115 are in multiple partitions on multiple database nodes. For example, the record identifiers 115 may be within partitions P1-P12 on database nodes N1-N4 in FIG. 1.

If a statement with record identifiers 115 that map to multiple partitions on multiple database nodes is sent to one of the database nodes, the receiving database node would need to generate a request to at least one other database node, resulting in communication between database nodes. Moreover, if a receiving database node receives a statement with record identifiers 115 in more than one partition on that database node, the receiving database node would need to process the statement using more than one partition.

In 205, database client 120 receives a request from client 110 to access multiple record identifiers 115 in distributed database 130. In 210, database client 120 maps each record identifier 115 to a partition P, and assigns a partition identifier and database node identifier to each record identifier 115. In 220, database client 120 determines whether all of the record identifiers 115 map to a single partition on a single database node. If not, in 230 database client 120 determines whether the record identifiers 115 map to multiple partitions on a single database node. If not, control shifts to marker 4 for method 400 in FIG. 4.

In order to reduce communication between database nodes, in 410 the database client 120 sorts the record identifiers 115 by database node and partition.

Once sorted, the database client may generate statements from the sorted record identifiers 115, with a first set of sorted record identifiers 115 in a first statement, a second set of sorted record identifiers 115 in a second statement, and so on until reaching the end of the list of sorted record identifiers 115. The number of sorted record identifiers 115 can be grouped into substantially equal groupings, up to a maximum statement size. As the list is sorted, by database node and partition, it is more likely that each statement includes fewer database nodes, and fewer partitions, than would result if the record identifiers 115 were not sorted. Therefore, each statement can be routed to a "best" database node for which most, if not all, of the record identifiers 115 for that statement are stored. If there are record identifiers 115 on other database nodes, then the "best" database node would need to communicate with the other database nodes, resulting in some communication between database nodes.

In 410, the database client 120 sorts the record identifiers 115 by partition.

For each partition, in 420, the database client 120 determines if the record identifiers 115 for the respective partition would result in a statement that exceeds a maximum block size.

If not, for each partition, in 430, the database client 120 generates a single statement addressed to the corresponding database node and the corresponding partition. In 435, for each partition, the database client 120 routes the single statement to the corresponding database node and the corresponding partition.

If the maximum block size is exceeded, for each partition, in 440 the database client 120 generates multiple statements addressed to the corresponding database node and the corresponding partition.

This enables a reduction in the amount of communication between database nodes, because the database client sorted the list of record identifiers 115 by database node and partition, and then generated statements with record identifiers 115. This will result in each statement including record identifiers 115 from a single database node. The receiving database node would not need to communicate with other database nodes to fulfill the statement. As the list is sorted by partition, it is more likely that each statement includes fewer partitions than would result if the record identifiers 115 were not sorted. Therefore, each statement would require that the database node to which the statement is routed would need to process sorted record identifiers 115 from fewer partitions on that database node, than would be required if the record identifiers 115 were not sorted by partition.

In some embodiments, the record identifier 115 list can be segmented by both database node and partition. This will result in each statement including record identifiers 115 from a single partition on a single database node. Therefore, each statement can be routed to the database node with all record identifiers 115 of the statement. The receiving database node would not need to communicate with other database nodes to fulfill the statement. As all of the record identifiers 115 are from a single partition on the single database node, the receiving database node can fulfill the statement using a single partition on a single database node, without having to process record identifiers 115 from more than one partition, or communicate with other database nodes.

If the number of record identifiers 115 that map to a corresponding partition would result in a statement that exceeds a maximum block size, the database client generates multiple statements, so that each statement has a length less than or equal to the maximum block size.

For some embodiments, the database client segments the record identifiers 115 list for the corresponding partition into substantially equal length packages. The database client then generates a statement for each package of a substantially fixed length less than or equal to a maximum block size.

For some embodiments, the database client segments the record identifier 115 list for the corresponding partition so that all but the final package are of substantially equal length corresponding to a maximum block size, and the final shorter length package includes the remaining record identifiers 115. The database client then generates a statement for each package. All but the last generated statement for the corresponding partition has a length substantially equal to the maximum block size. The last generated statement with the remaining record identifiers 115 has a length less than or equal to a maximum block size.

In 445, for each partition, the database client 120 routes the multiple statements to the corresponding database node and corresponding partition.

The disclosed technology can be applied to a wide variety of commercial large scale distributed databases, with database clients 120 that access the distributed database 130, and application software on clients 110 that generates queries with large numbers of record identifiers 115. In order to quantify the increase in efficiency improvements that may be possible from the disclosed technology, the following volume and stress tests were performed on a High Performance Analytic Appliance (HANA) distributed database on seven database nodes with twenty-nine Netweaver database clients to schedule more than 2,000 jobs. Advanced Business Application Programming (ABAP) application software generated FOR ALL ENTRIES (FAE) System Query Language (SQL) statements with queried element tables having a number of entries exceeding a maximum blocking factor of 50. The FOR ALL ENTRIES SQL statement was selected for the test because it generates large numbers of record identifiers 115, as would be expected when operating scaled-out databases with multiple concurrent users.

The partition schema used for the test included four related database tables, each with approximately 5 billion records, using hash and range partitioning. The first 32 partitions were distributed over six database nodes, with about five partitions per database node. The ABAP modules performing FOR ALL ENTRIES SQL statement were run using both traditional methods, in which the record identifiers 115 are not sorted by partition, and the methods disclosed herein, in which the record identifiers 115 are sorted by partition. Sorting by partition, and generating statements with record identifiers 115 grouped by partition and database node, reduced query processing time by a factor of more than five.

Figure 5:
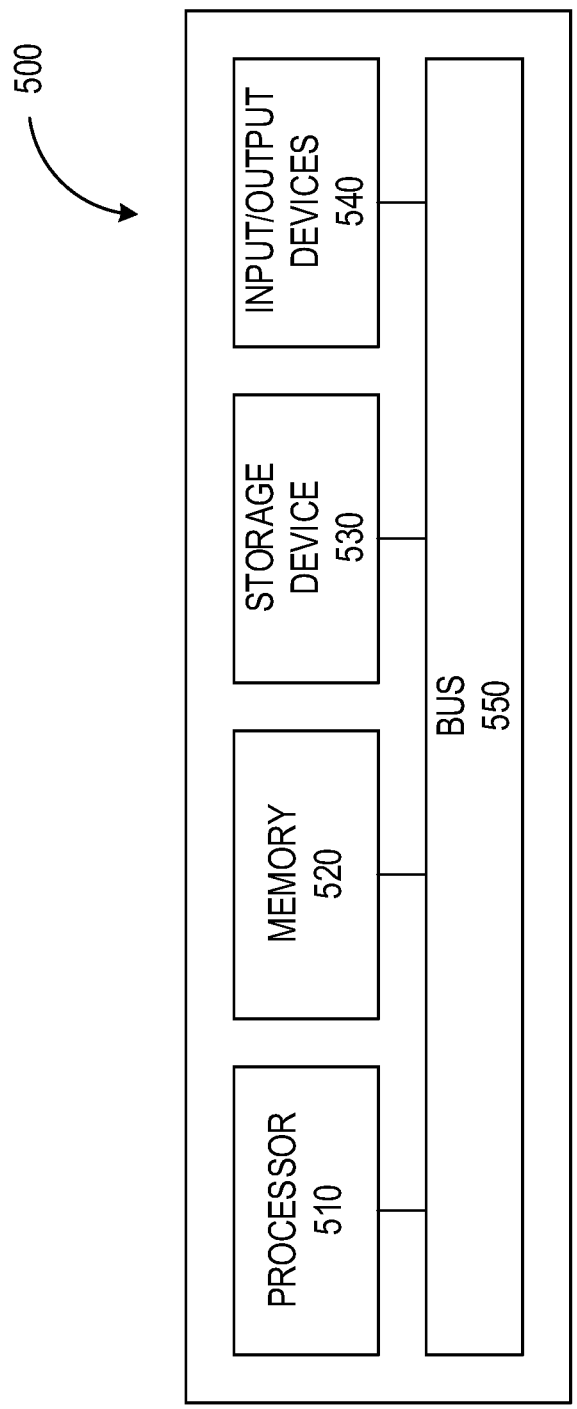
FIG. 5 depicts a block diagram illustrating a computing system consistent with implementations of the current subject matter.

FIG. 5 depicts a block diagram illustrating a computing system 500 consistent with implementations of the current subject matter. Referring to FIGS. 1 and 5, the computing system 500 can be used to implement the client 110, the database client 120, the distributed database 130, and/or any components therein.

As shown in FIG. 7, the computing system 700 can include a processor 710, a memory 720, a storage device 730, and input/output devices 740. The processor 710, the memory 720, the storage device 730, and the input/output devices 740 can be interconnected via a system bus 750. The processor 710 is capable of processing instructions for execution within the computing system 700. Such executed instructions can implement one or more components of, for example, the client 110. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 700 can be used to execute various interactive computer software applications that can be used for organization, analysis and/or storage of data in various (e.g., tabular) format (e.g., Microsoft Excel®, and/or any other type of software). Alternatively, the computing system 700 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be stand-alone computing products and/or functionalities. Upon activation within the applications, the functionalities can be used to generate the user interface provided via the input/output device 740. The user interface can be generated and presented to a user by the computing system 700 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
   at least one data processor; and
   at least one memory storing instructions which, when executed by the at least one data processor, result in operations comprising:
      receiving, at a database client, a request to access a plurality of data elements, the request received from an application at a client, the plurality of data elements identified by a plurality of record identifiers, each data element stored in one of a plurality of partitions of a database table, each of the plurality of partitions stored on one of a plurality of database nodes, wherein the database client includes a first interface to the application at the client and one or more second interfaces to the plurality of database nodes;
      mapping, at the database client, the plurality of record identifiers to a corresponding partition and a corresponding one of the plurality of database nodes;
      determining, at the database client, whether the plurality of record identifiers map to a single partition of the plurality of partitions on a single database node of the plurality of nodes;
      in response to determining the plurality of record identifiers associated with the request map to the single partition of the plurality of partitions on the single database node of the plurality of nodes, in response to a single statement not exceeding a first threshold size, generating and routing, at the database client, the single statement to the single partition and the single database node to request access to the plurality of data elements identified by the plurality of record identifiers, in response to the single statement exceeding the first threshold size, generating and routing, at the database client, a plurality of statements addressed to the single partition and the single database node to request access to the plurality of data elements identified by the plurality of record identifiers; and in response to determining the plurality of record identifiers associated with the request map to the plurality of partitions and the plurality of database nodes, sorting, at the database client, the plurality of record identifiers, wherein the sorting includes sorting by database node, and for each of the database node, sorting by partition in which each corresponding data element is stored, determining for each of the partitions, whether a second threshold size is exceeded for a corresponding statement sent towards a corresponding partition, in response to the second threshold size not being exceeded, for each database node and partition, generating and routing, at the database client, a single statement addressed to the corresponding database node and partition, each single statement comprising at least one request to access a data element stored in the corresponding database node and partition, and in response to the second threshold size being exceeded, for each database node and partition, generating and routing, at the database client, a plurality of statements addressed to the corresponding database node and partition to request access to the data element stored in the corresponding database node and partition.

2. The system of claim 1, the instructions which, when executed by the at least one data processor, further comprise determining, for each database node and partition, whether a length of a single statement including all of the record identifiers for the respective partition exceeds a maximum block size, wherein the maximum block size comprising the first threshold size and/or the second threshold size.

3. The system of claim 2, the instructions which, when executed by the at least one data processor, further comprise generating, for each database node and partition, a single statement in response to determining that the length of the single statement is less than or equal to the maximum block size.

4. The system of claim 2, the instructions which, when executed by the at least one data processor, further comprise generating, for each database node and partition, the plurality of statements in response to determining that the length of the single statement exceeds the maximum block size.

5. The system of claim 4, the instructions which, when executed by the at least one data processor, further comprise generating, for each database node and partition, the plurality statements of fixed length less than or equal to a maximum block size.

6. The system of claim 4, the instructions which, when executed by the at least one data processor, further comprise generating, for each database node and partition, the plurality of statements, wherein all but one of the statements are of equal length corresponding to a maximum block size.

7. The system of claim 1, the instructions which, when executed by the at least one data processor, further comprise mapping each record identifier to the partition in which the corresponding data element is stored using a hash table.

8. The system of claim 1, the instructions which, when executed by the at least one data processor, further comprise mapping each record identifier to the partition in which the corresponding data element is stored using minimum and maximum record identifier values for at least one partition.

9. A computer-implemented method, comprising:

receiving, at a database client, a request to access a plurality of data elements, the request received from an application at a client, the plurality of data elements identified by a plurality of record identifiers, each data element stored in one of a plurality of partitions of a database table, each of the plurality of partitions stored on one of a plurality of database nodes, wherein the database client includes a first interface to the application at the client and one or more second interfaces to the plurality of database nodes;

mapping, at the database client, the plurality of record identifiers to a corresponding partition and a corresponding one of the plurality of database nodes;

determining, at the database client, whether the plurality of record identifiers map to a single partition of the plurality of partitions on a single database node of the plurality of nodes;

in response to determining the plurality of record identifiers associated with the request map to the single partition of the plurality of partitions on the single database node of the plurality of nodes, in response to a single statement not exceeding a first threshold size, generating and routing, at the database client, the single statement to the single partition and the single database node to request access to the plurality of data elements identified by the plurality of record identifiers, in response to the single statement exceeding the first threshold size, generating and routing, at the database client, a plurality of statements addressed to the single partition and the single database node to request access to the plurality of data elements identified by the plurality of record identifiers; and in response to determining the plurality of record identifiers associated with the request map to the plurality of partitions and the plurality of database nodes, sorting, at the database client, the plurality of record identifiers, wherein the sorting includes sorting by database node, and for each of the database node, sorting by partition in which each corresponding data element is stored, determining for each of the partitions, whether a second threshold size is exceeded for a corresponding statement sent towards a corresponding partition, in response to the second threshold size not being exceeded, for each database node and partition, generating and routing, at the database client, a single statement addressed to the corresponding database node and partition, each single statement comprising at least one request to access a data element stored in the corresponding database node and partition, and in response to the second threshold size being exceeded, for each database node and partition, generating and routing, at the database client, a plurality of statements addressed to the corresponding database node and partition to request access to the data element stored in the corresponding database node and partition.

10. The method of claim 9, further comprising determining, for each database node and partition, whether a length of a single statement including all of the record identifiers for the respective partition exceeds a maximum block size, wherein the maximum block size comprising the first threshold size and/or the second threshold size.

11. The method of claim 10, further comprising generating, for each database node and partition, a single statement in response to determining that the length of the single statement is less than or equal to the maximum block size.

12. The method of claim 10, further comprising generating, for each database node and partition, the plurality of statements in response to determining that the length of the single statement exceeds the maximum block size.

13. The method of claim 10, further comprising generating, for each database node and partition, the plurality statements of fixed length less than or equal to a maximum block size.

14. The method of claim 10, further comprising generating, for each database node and partition, the plurality of statements, wherein all but one of the statements are of equal length corresponding to a maximum block size.

15. The method of claim 10, further comprising mapping each record identifier to the partition in which the corresponding data element is stored using a hash table.

16. The method of claim 10, further comprising mapping each record identifier to the partition in which the corresponding data element is stored using minimum and maximum record identifier values for at least one partition.

17. A non-transitory computer-readable medium storing instructions, which when executed by at least one data processor, result in operations comprising:
  receiving, at a database client, a request to access a plurality of data elements, the request received from an application at a client, the plurality of data elements identified by a plurality of record identifiers, each data element stored in one of a plurality of partitions of a database table, each of the plurality of partitions stored on one of a plurality of database nodes, wherein the database client includes a first interface to the application at the client and one or more second interfaces to the plurality of database nodes;
  mapping, at the database client, the plurality of record identifiers to a corresponding partition and a corresponding one of the plurality of database nodes;
  determining, at the database client, whether the plurality of record identifiers map to a single partition of the plurality of partitions on a single database node of the plurality of nodes;
    in response to determining the plurality of record identifiers associated with the request map to the single partition of the plurality of partitions on the single database node of the plurality of nodes,
      in response to a single statement not exceeding a first threshold size, generating and routing, at the database client, the single statement to the single partition and the single database node to request access to the plurality of data elements identified by the plurality of record identifiers,
      in response to the single statement exceeding the first threshold size, generating and routing, at the database client, a plurality of statements addressed to the single partition and the single database node to request access to the plurality of data elements identified by the plurality of record identifiers; and
    in response to determining the plurality of record identifiers associated with the request map to the plurality of partitions and the plurality of database nodes,
      sorting, at the database client, the plurality of record identifiers, wherein the sorting includes sorting by database node, and for each of the database node, sorting by partition in which each corresponding data element is stored,
      determining for each of the partitions, whether a second threshold size is exceeded for a corresponding statement sent towards a corresponding partition,
      in response to the second threshold size not being exceeded, for each database node and partition, generating and routing, at the database client, a single statement addressed to the corresponding database node and partition, each single statement comprising at least one request to access a data element stored in the corresponding database node and partition, and
      in response to the second threshold size being exceeded, for each database node and partition, generating and routing, at the database client, a plurality of statements addressed to the corresponding database node and partition to request access to the data element stored in the corresponding database node and partition.

18. The medium of claim 17, the instructions which, when executed by the at least one data processor, further comprise generating, for each database node and partition, a single statement in response to determining that a length of a single statement including all of the record identifiers for the respective partition is less than or equal to a maximum block size, wherein the maximum block size comprising the first threshold size and/or the second threshold size.

19. The medium of claim 17, the instructions which, when executed by the at least one data processor, further comprise generating, for each database node and partition, the plurality statements of fixed length less than or equal to a maximum block size, in response to determining that a length of a single statement including all of the record identifiers for the respective partition exceeds the maximum block size.

20. The medium of claim 17, the instructions which, when executed by the at least one data processor, further comprise generating, for each database node and partition, the plurality of statements, wherein all but one of the statements are of equal length corresponding to a maximum block size, in response to determining that a length of a single statement including all of the record identifiers for the respective partition exceeds the maximum block size.

* * * * *